Sept. 23, 1947.  E. M. DAVIS  2,427,840

WASHING DEVICE

Filed Sept. 3, 1943

ATTEST –
Hm C. Meiser

Elmer M. Davis
INVENTOR

BY R.H. Story
ATTORNEY

Patented Sept. 23, 1947

2,427,840

UNITED STATES PATENT OFFICE 2,427,840

WASHING DEVICE

Elmer M. Davis, St. Paul, Minn., assignor to Industrial Patents Corporation, Chicago, Ill., a corporation of Delaware Application September 3, 1943, Serial No. 501,107

13 Claims. (Cl. 17—11)

1

This invention relates to an improved process and apparatus for treating poultry and more particularly to an improved process and apparatus for removing undigested food and other particles from the fore-alimentary tract of a bird.

In the commercial handling of poultry and after the bird has been killed, it is most desirable that the undigested food in the crop of the bird be removed before the carcass is delivered to the consumer market. This requirement, that the food be removed arises from the fact that the undigested food particles carried in the fore-alimentary tract of the bird deteriorate rapidly and produce offensive odors upon decomposing and, furthermore, the weight of the feed in the crop unduly increases the weight of the bird. For the consumer's benefit, therefore, it is essential that all waste should be removed. Also, during the slaughtering process, sometimes blood seeps into the bird's mouth and in order to make the carcass more presentable it is important that this objectionable matter be removed.

In the past, it has been suggested that the crop be removed by cutting it from the carcass. This provides an opening for accumulation of bacteria and deterioration of the carcass may be promoted. Also the insertion of vacuum means to clean the fore-alimentary tract has been proposed and the practice of this cleaning method has been found to be quite satisfactory.

The present invention has been provided to improve the cleaning action as accomplished by the vacuum process.

It is therefore an object of this invention to provide an improved process and apparatus for cleaning the fore-alimentary tract of poultry products.

It is another object of this invention to provide an improved vacuum cleaning and washing apparatus for removing waste materials from the mouth and crop of a bird.

Other objects will appear more fully from the specification below.

Figure 1:
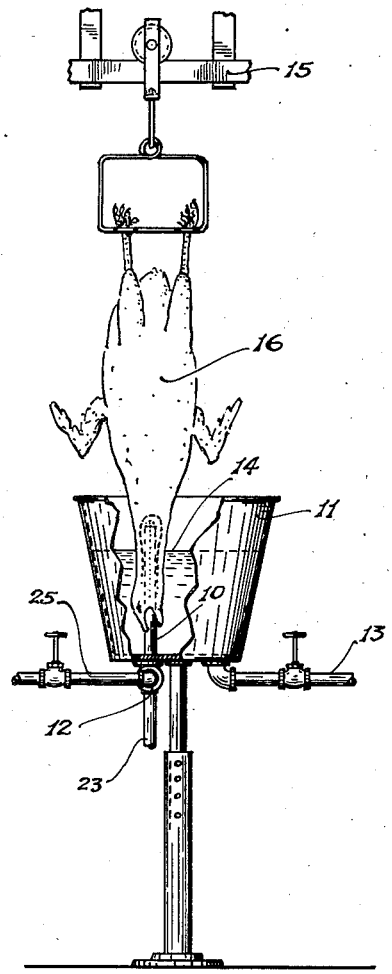
Figure 3:
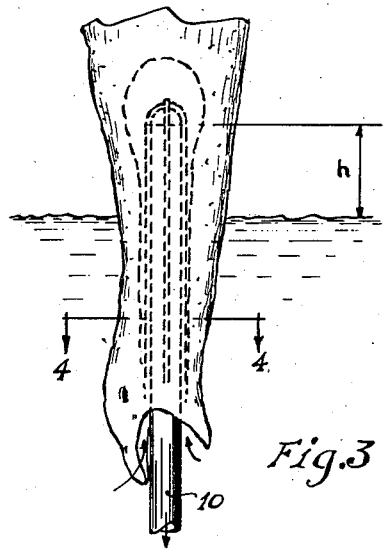
Figure 2:
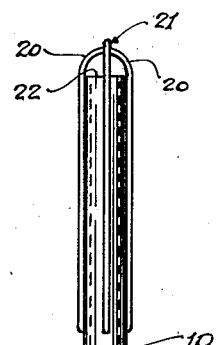

Figure 1 is a side elevation partly broken away showing the preferred form of the improved apparatus for cleaning the mouth and crop of a slaughtered bird, Figure 2 is a detail side elevation, partly broken away, showing the vacuum producing means and tube used for insertion in the fore-alimentary tract of the slaughtered bird, Figure 3 is a detail view showing the tube inserted in the fore-alimentary tract of a slaughtered bird, and

2

Figure 4:
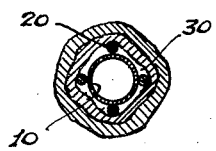

Figure 4 is a sectional view taken on line 4—4 of Figure 3.

This invention has been provided to make available means for first applying a vacuum to the crop of a slaughtered bird and thereafter inducing a flow of a washing fluid through the fore-alimentary tract to completely cleanse the mouth and throat of the bird, including its crop, etc. The vacuum means is effective to first remove the larger particles of feed and other matter lodged in this portion of the carcass and the subsequent flushing action, accomplished by flowing a washing fluid through the fore-alimentary tract of the bird, completes the cleaning process.

In practicing this invention, a tube having vacuum means associated therewith is inserted in the mouth of the bird and is passed through the fore-alimentary tract of the bird to reach into its crop. A vacuum is created within the bore of the tube and the vacuum draws out any food particles which are presented to the mouth of the tube as it is inserted into the crop. After the tube has been inserted in the carcass, the arrangement is such that a flushing fluid is then induced to flow into the mouth, through the throat, and into the crop of the bird from where it empties into the mouth of the tube and is carried away to a disposal means. The flushing fluid scours the walls of the fore-alimentary tract to remove the remaining particles adhering thereto so that all matter that may decompose is removed.

Referring more particularly to the drawings, a preferred form of the invention is shown and Figure 1 represents an assembled view of the improved apparatus of this invention. In this figure, the tube 10 is the vacuum tube provided for insertion into the mouth of the bird and it is of such length that it will pass through the throat of the bird into the crop where undigested food particles may be temporarily lodged before passing into the digestive system of the bird. The vacuum tube 10 extends through the bottom of a receptacle 11 and has any suitable vacuum producing means 12 associated therewith. The receptacle 11 has suitable water supply 13 affixed thereto and automatic float means (not shown) may be provided if desired to maintain the level of the water in the receptacle at about the line 14 shown in Figure 1. The vacuum tube 10 preferably extends upwardly through the receptacle to a point above the water level 14 for a purpose that will appear below.

The receptacle 11 may be positioned under a railway 15 and a bird 16, to be cleaned, may be held in position over the tube 10 as shown in Figure 1 so that its mouth may be slipped over the tube and pushed downwardly whereby the tube is inserted into its throat and crop.

In Figure 2, the detail construction of tube 10 is best shown, and the tube may have and preferably does have spacers 20 fixedly secured thereto to extend longitudinally along the outer periphery of the tube. The spacers 20 may take the form of cylindrical rods integral with the tube and are provided at their upper ends with a nose 21 which is formed by bending the rods into a smooth curve to provide a loop spaced somewhat from the upper end 22 of the tube 10.

The lower end of the tube, as shown in Figure 2, is connected with a suction T 12 for producing a vacuum in the tube and steam is delivered into the suction T from pipe 23 through nozzle 24 to issue into the drain pipe 25. The flow of steam through the suction T induces a vacuum in the tube 10 and depending upon the pressure of steam admitted to the nozzle 24, the vacuum can be controlled. Any suitable pressure control valve means may be provided on the steam inlet side to control the degree of vacuum produced. It is obvious, however, that any other vacuum producing means might be substituted for the suction T.

To use the above described apparatus, a bird is positioned over the cleaning apparatus, as shown in Figure 1, and the mouth of the bird is fitted over the end of the tube 10 to create a vacuum within the mouth of the bird whereby all loose particles lodged therein are removed. As the tube is rapidly driven further into the mouth, through the throat, and into the crop of the bird, a vacuum is applied throughout the fore-alimentary tract of the bird to effect the removal of a large part of the undigested food and other loose matter situated there. When the tube is pushed through the tract, it tends to scrape the walls of the tract to loosen particles tending to adhere thereto.

During the act of inserting the tube into the crop, the mouth of the bird passes below the level 14 of the fluid contained in receptacle 11 and, thus, the flow of air from the atmosphere through the fore-alimentary tract and into the vacuum tube is cut off. The fluid contained in the receptacle and surrounding the mouth of the bird is then subjected to the vacuum and it is caused to flow upwardly in space 30 (Figure 4) between the outside of the tube and the inner wall of the fore-alimentary tract. The fluid is lifted upwardly into the crop of the bird and flows into the upper end 22 of the vacuum tube 10. In order to induce this flow of washing fluid through the mouth of the bird, up the wall of the fore-alimentary tract of the bird, and through the crop, a sufficiently high vacuum must, of course, be drawn in the tube to lift the fluid the distance $h$ shown in Figure 3.

Spacers 20 are disposed around the vacuum tube 10 so that a space 30 will be provided between the walls of the fore-alimentary tract and the tube for the flow of washing fluid upwardly. The nose 21 formed of the spacers 20 also insures a proper flow space by preventing the end of the tube from becoming sealed against the wall of the crop. The nose 21 further provides a blunt end for guiding the tube 10 through the fore-alimentary tract without tearing the walls of the tract as the mouth and neck of the bird are driven over the tube.

It is thus seen that this apparatus provides a means for first applying a vacuum to the mouth of the bird to be cleaned and as the tube is driven rapidly into the fore-alimentary tract of the bird, a vacuum is progressively applied to all portions of the fore-alimentary tract to remove food particles and the like. The tube tends to scrape the walls to loosen food particles adhering thereto and the simultaneous application of the suction means causes their rapid removal. After the mouth of the bird has passed below the level 14 of a water or washing fluid in receptacle 11, a fluid flow is induced through the fore-alimentary tract of the bird to complete the cleansing action started by the vacuum tube. The fluid passes longitudinally through the space 30 and continues the cleaning action originally effected by means of the vacuum to thoroughly rinse out the fore-alimentary tract.

The bird is held in position over the vacuum tube with its mouth under the water level for a sufficient time that all of the loose food particles, blood, etc. are washed through the vacuum tube into the drain 25. The carcass may then be removed from this cleaning apparatus for further processing and delivery to the consumer market.

As the neck of the bird is being removed from the vacuum tube 10 of the apparatus shown in Figure 1, it will be noted that, when the mouth of the bird passes into a position just above the level of liquid 14 in the receptacle, a vacuum will still be applied to the fore-alimentary tract of the bird after the flow of flushing liquid is discontinued. This application of vacuum at the mouth of the bird as the bird is being removed accomplishes a more rapid drainage of washing fluid from the fore-alimentary tract of the bird than would otherwise be encountered, and thus, substantially all dripping of liquid from the mouth of the bird is eliminated.

The washing fluid contained in the receptacle 11 may comprise a body of water or any other fluid which will efficiently remove the particles normally present in the fore-alimentary tract of poultry. Chemicals may be added to water or other fluid to aid the removal of the particles present and to disinfect the fore-alimentary tract if desired.

In the preferred form of the invention, the upper end of the vacuum tube 10 extends above the level of the fluid contained in the receptacle 11 in order that a vacuum can first be applied to the fore-alimentary tract of the bird to initially clean it and also to prevent waste of washing fluid when no bird is being cleaned. Considering this last condition, it will be seen that, inasmuch as the upper end of the vacuum tube 10 is disposed above the level of the fluid in the receptacle 11, washing fluid can pass into the drain only when a bird is positioned over the vacuum tube. If it is desirable to use only a fluid action for cleaning the fore-alimentary tract, the upper end of the tube 10 may be disposed below the level of fluid 14 in the receptacle 11 and a continuous flow of washing fluid into the tube will take place and, as the bird is positioned over the tube, the continuous fluid flow will continue as the bird is drawn down over the tube so that a washing step alone is performed.

In the broadest aspects, this device may be used to clean any passage having one end closed and the other open. Wherever such a closed passage can be placed over a vacuum tube, a washing fluid may be induced to flow through the passage to flush it clean. The velocity of the flow of fluid can be varied from a gentle washing flow to a fast moving scrubbing stream by varying the degree of vacuum applied to the tube and by adjusting the height $h$ which indicates the distance the end of the tube extends above the fluid level in container 11.

The above embodies the preferred form of this invention and the best mode of practicing the cleaning method here taught. Other modifications will occur to those skilled in the art all of which are contemplated to be within the scope of the following claims.

I claim:

1. The process of treating poultry comprising inducing an air flow through the mouth of the bird by applying suction to the interior of the fore-alimentary tract of the bird to remove the contents thereof, said air being continuously moved through the tract in one direction, and thereafter inducing a flow of washing fluid into and through the fore-alimentary tract of the bird.

2. The process of treating poultry comprising inducing an air flow through the mouth of the bird by applying suction to the interior of the crop of the bird to remove the contents thereof, said air being continuously moved through the tract in one direction, and thereafter inducing a flow of washing fluid into and through the crop of the bird.

3. The process of treating poultry comprising scraping the walls of the fore-alimentary tract of the bird while applying suction at the walls and thereafter inducing a flow of washing fluid through the fore-alimentary tract of the bird to complete the cleansing action.

4. The process of treating poultry comprising applying a scraping and vacuum means to the walls of the fore-alimentary tract of the bird, then inducing a flow of a washing fluid into and through the fore-alimentary tract of the bird, and then again applying suction to the fore-alimentary tract of the bird to aid in the drainage of the washing fluid from the fore-alimentary tract of the bird.

5. A device for cleaning the fore-alimentary tract of a poultry product comprising a tube for insertion into the tract; said tube having a cross-sectional shape substantially the same as that of the tract and being of a size to substantially fill the passage so that only a small space is left between the inside wall of the tract and the outside wall of the tube, said tube being of a length to reach approximately to the end of said tract, spacing means to provide an open passageway between the tube and the tract, means for continuously creating a vacuum within the tube during the cleaning operation; and means to supply a washing fluid around the mouth of the bird; whereby when the tube is inserted in the mouth of the bird, the vacuum is effective to clear the fore-alimentary tract of all loose matter therein and to draw the washing fluid therethrough to cleanse the tract.

6. A device for cleaning the fore-alimentary tract of a poultry product comprising a vertically extending tube for insertion into the tract; said tube having a cross-sectional shape substantially the same as that of the tract and being of a size to substantially fill the passage so that only a small space is left between the inside wall of the tract and the outside wall of the tube, said tube being of a length to reach approximately to the end of said tract, spacing means to provide an open passageway between the tube and the tract, means for continuously creating a vacuum within the tube during the cleaning operation; and means to supply a washing fluid around the mouth of the bird; whereby when the tube is inserted in the mouth of the bird, the vacuum is effective to clear the fore-alimentary tract of all loose matter therein and to draw the washing fluid therethrough to cleanse the tract.

7. A device for cleaning the fore-alimentary tract of a poultry product comprising a substantially cylindrical tube for insertion into the tract; said tube being of approximately the same size as the internal diameter of the tract; said tube having spacing means integral therewith to hold the walls of the tract spaced from the wall of the tube; means for creating a vacuum within the tube; and means to supply a washing fluid around the mouth of the bird; whereby when the tube is inserted in the mouth of the bird, the vacuum is effective to clear the fore-alimentary tract of all loose matter therein and to draw the washing fluid therethrough to cleanse the tract.

8. A device for cleaning the fore-alimentary tract of a poultry product comprising a tube for insertion into the tract, said tube having a cross-sectional shape substantially the same as that of the tract and being of a size to substantially fill the passage so that only a small space is left between the inside wall of the tract and the outside wall of the tube, said tube being of a length to reach approximately to the end of said tract, spacing means to provide an open passageway between the tube and the tract, means for continuously creating a vacuum within the tube during the cleaning operation, a receptacle for containing a washing fluid, said tube extending into said receptacle so that the mouth of the bird may be positioned over the tube and forced below the surface of the liquid contained in the receptacle whereby the vacuum in the tube induces a flow of washing fluid into the fore-alimentary tract of the bird to cleanse it of all loose matter.

9. A device for cleaning the fore-alimentary tract of poultry comprising a vertically extending tube for insertion into the tract, said tube having a cross-sectional shape substantially the same as that of the tract and being of a size to substantially fill the passage so that only a small space is left between the inside wall of the tract and the outside wall of the tube, said tube being of a length to reach approximately to the end of said tract, spacing means to provide an open passageway between the tube and the tract, means for creating a vacuum only within the tube, and a receptacle containing a washing fluid, said tube extending through the bottom of said receptacle with its upper end disposed above the level of a washing fluid in the receptacle, said construction being provided so that the mouth of a bird may be positioned over the tube and a vacuum applied to the fore-alimentary tract of the bird to remove loose particles and induce a flow of washing fluid through the fore-alimentary tract of the bird when the mouth of the bird is driven below the level of the washing liquid contained in the receptacle and a vacuum is again applied to the fore-alimentary tract of the bird to drain the tract as the bird is being removed from the vacuum tube.

10. An apparatus for cleaning an elongated passage that is closed at one end comprising a tube for insertion into the open end of the passage, said tube having a cross-sectional shape substantially the same as that of the passage and being of a size to substantially fill the passage so that only a small space is left between the inside wall of the passage and the outside wall of the tube, said tube being of a length to reach approximately to the end of said closed passage, spacing means to provide an open passageway between the tube and the tract, means for creating a vacuum only within the tube, and means for supplying a washing fluid around the open end of the passage, said construction being provided so that the tube will vacuumize the passage to remove loose particles and induce a flow of washing fluid through the passage.

11. An apparatus for cleaning an elongated passage that is closed at one end comprising a tube for insertion into the open end of the passage, said tube having a cross-sectional shape substantially the same as that of the passage and being of a size to substantially fill the passage so that only a small space is left between the inside wall of the passage and the outside wall of the tube, said tube being of a length to reach approximately to the end of said closed passage, spacing means positioned between the tube and the walls of the passage to hold the tube centered therein, means for creating a vacuum only within the tube, and means for supplying a washing fluid around the open end of the passage, the upper end of said tube extending above the fluid level maintained in the means for supplying the washing fluid, said construction being provided so that the tube will first vacuumize the passage to remove loose particles and then induce a flow of washing fluid through the passage.

12. The process of treating poultry comprising continuously applying suction to the interior of the fore-alimentary tract of the bird to remove the contents thereof, using said suction to induce a flow of air continuously in one direction through said tract, thereafter inducing a flow of washing fluid into and through the fore-alimentary tract of the bird, said washing fluid being induced to flow through said tract in the same direction as the air movement, and then inducing an air flow in said one direction through the mouth of the bird to remove residual wash water from the tract.

13. The process of treating poultry comprising continuously applying suction to the interior of the crop of the bird to remove the contents thereof using said suction to induce a flow of air continuously in one direction through said tract, thereafter inducing a flow of washing fluid into and through the crop of the bird, said washing fluid being induced to flow through said tract in the same direction as the air movement, and then inducing an air flow in said one direction through the mouth of the bird to remove residual wash water from the tract.

ELMER M. DAVIS.

REFERENCES CITED

The following references are of record in the file of this patent:

UNITED STATES PATENTS

| Number | Name | Date |
| --- | --- | --- |
| 2,243,015 | Patterson | May 20, 1941 |
| 2,158,904 | Meeker et al. | May 16, 1939 |
| 884,992 | Rabideau | Apr. 14, 1908 |
| 981,433 | Lamb | Jan. 10, 1911 |
| 1,134,530 | Hauber | Apr. 6, 1915 |
| 2,310,881 | Swanson | Feb. 9, 1943 |
| 1,134,529 | Hauber | Apr. 6, 1915 |
| 2,237,203 | Swanson | Apr. 1, 1941 |